US009590672B2

United States Patent
Kodama (10) Patent No.: US 9,590,672 B2
(45) Date of Patent: Mar. 7, 2017

(54) METHOD FOR DETERMINING THRESHOLD VALUE OF RADIO WAVE INTENSITY FOR DISTINGUISHING NOISE IN RADIO WAVES, AND RELATED WIRELESS COMMUNICATION APPARATUS, ANALYSIS APPARATUS, AND NON-TRANSITORY COMPUTER READABLE MEDIUM (71) Applicant: NEC Corporation, Minato-ku, Tokyo (JP)

(72) Inventor: Shinichirou Kodama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/653,378

(22) PCT Filed: Jan. 20, 2014

(86) PCT No.: PCT/JP2014/000238
§ 371 (c)(1),
(2) Date: Jun. 18, 2015

(87) PCT Pub. No.: WO2014/112390
PCT Pub. Date: Jul. 24, 2014

(65) Prior Publication Data
US 2015/0372703 A1    Dec. 24, 2015

(30) Foreign Application Priority Data
Jan. 21, 2013  (JP) ................................. 2013-008657

(51) Int. Cl.
*H04B 1/10* (2006.01)
*H04B 17/345* (2015.01)
*H04B 17/336* (2015.01)

(52) U.S. Cl.
CPC ......... *H04B 1/1027* (2013.01); *H04B 17/345* (2015.01); *H04B 17/336* (2015.01)

(58) Field of Classification Search
None
See application file for complete search history.

(56) References Cited

U.S. PATENT DOCUMENTS 6,671,331 B1 * 12/2003 Sakuma ............... H04B 17/309
                                                       375/316
2007/0103360 A1 * 5/2007 Nakanishi ............... G01S 7/354
                                                       342/70

FOREIGN PATENT DOCUMENTS

JP    H05-150795 A    6/1993
JP    2001-257611 A   9/2001
(Continued)

OTHER PUBLICATIONS

International Search Report for PCT Application No. PCT/JP2014/000238, mailed on Apr. 8, 2014.
(Continued)

*Primary Examiner* — Alejandro Rivero (57) ABSTRACT

Provided are a wireless communication apparatus, an analysis apparatus, an analysis method and a non-transitory computer readable medium on which a program has been stored, in which a threshold value to be used for determining whether received radio waves are noise can be determined independently of an operator's capability. A threshold value is determined, on the basis of a number of intersections between a variation curve of radio wave intensity relative to the frequencies of the radio waves received by a receiver and a first line indicating a given radio wave intensity, a threshold value of radio wave intensity to be used for determining whether the received radio waves are noise.

9 Claims, 4 Drawing Sheets (56) References Cited

FOREIGN PATENT DOCUMENTS

| | | |
|---|---|---|
| JP | 2006-340212 A | 12/2006 |
| JP | 2008-268126 A | 11/2008 |
| JP | 2009-218679 A | 9/2009 |
| JP | 2012-168119 A | 9/2012 |
| WO | 2005/059588 A1 | 6/2005 |

OTHER PUBLICATIONS

English translation for Write opinion of PCT Application No. PCT/JP2014/000238.
Japanese Notice of Allowance for JP Application No. 2013-008657 mailed on Apr. 8, 2014 with English Translation.

\* cited by examiner

METHOD FOR DETERMINING THRESHOLD VALUE OF RADIO WAVE INTENSITY FOR DISTINGUISHING NOISE IN RADIO WAVES, AND RELATED WIRELESS COMMUNICATION APPARATUS, ANALYSIS APPARATUS, AND NON-TRANSITORY COMPUTER READABLE MEDIUM

This application is a National Stage Entry of PCT/JP2014/000238 filed on Jan. 20, 2014, which claims priority from Japanese Patent Application 2013-008657 filed on Jan. 21, 2013, the contents of all of which are incorporated herein by reference, in their entirety.

TECHNICAL FIELD

The present invention relates to a wireless communication apparatus, an analysis apparatus, an analysis method and a non-transitory computer readable medium on which a program has been stored, and, more particularly, to a wireless communication apparatus, an analysis apparatus, an analysis method and a non-transitory computer readable medium on which a program has been stored, which process received radio waves.

BACKGROUND ART

A radio wave includes frequencies which become noise in addition to effective frequencies. Accordingly, when use conditions and an emission situation of radio waves is analyzed, whether a received radio wave is a frequency of an analysis target or a frequency of noise or not needs to be distinguished.

For example, in patent literature 1, there is disclosed a method to carry out processing to: detect, by comparing a standard DISPLAY line (a standard power level) set by an observer in advance and a broadband frequency spectrum signal outputted from a frequency domain equalization unit, a radio wave having reception power higher than the standard DISPLAY line; and calculate the features of the radio wave.

CITATION LIST

Patent Literature

[PTL 1] Japanese Patent Application Laid-Open No. 2008-268126

SUMMARY OF INVENTION

Technical Problem

In technologies such as in patent document 1, an operator determines a threshold value of radio wave intensity for distinguishing whether received radio waves are effective frequencies of an analysis target or frequencies of noise from a variation curve of radio wave intensity relative to frequencies of the received radio waves based on the operator's experience (skill). The reason of this is that, the most suitable threshold value differs depending on places, seasons and the like. In such case, there is a problem that it is difficult for an inexperienced operator to distinguish whether it is an effective frequency or noise, and, thus, it is difficult to determine an appropriate threshold value.

An object of the present invention is to provide a wireless communication apparatus, an analysis apparatus, an analysis method and a program, which have been made in order to settle such problem, and can determine a threshold value for distinguishing whether received radio waves are noise or not without depending on the capability of an operator.

Solution to Problem

A wireless communication apparatus according to the present invention includes: a reception means for receiving radio waves; and a threshold value determination means for determining, on a basis of a number of intersections between a variation curve of radio wave intensity relative to frequencies of the radio waves received by said reception means and a first line indicating a given radio wave intensity, a threshold value of radio wave intensity for distinguishing whether the received radio waves are noise or not.

An analysis apparatus according to the present invention is an analysis apparatus for analyzing received radio waves, including a threshold value determination means for determining, on a basis of a number of intersections between a variation curve of radio wave intensity relative to frequencies of the radio waves received by said reception means and a first line indicating a given radio wave intensity, a threshold value of radio wave intensity for distinguishing whether the received radio waves are noise or not.

An analysis method according to the present invention detects a number of intersections between a variation curve of radio wave intensity relative to frequencies of radio waves received by said reception means and a first line indicating a given radio wave intensity, and determines, on a basis of said detected number of intersections, a threshold value of radio wave intensity for distinguishing whether the received radio waves are noise or not.

A program stored in a non-transitory computer readable medium according to the present invention makes a computer execute: a step of detecting a number of intersections between a variation curve of radio wave intensity relative to frequencies of received radio waves and a first line indicating a given radio wave intensity; and a step of determining, on a basis of said number of detected intersections, a threshold value of radio wave intensity for distinguishing whether the received radio waves are noise or not.

Advantageous Effect of Invention

According to the present invention, a wireless communication apparatus, an analysis apparatus, an analysis method and a non-transitory computer readable medium on which a program has been stored, which are capable of determining a threshold value for distinguishing whether received radio waves are noise or not without depending on the capability of an operator, can be provided.

DESCRIPTION OF EMBODIMENTS

Summary of the Present Invention

The summary of the present invention will be described using FIG. 1 before describing an exemplary embodiment.

Figure 1:
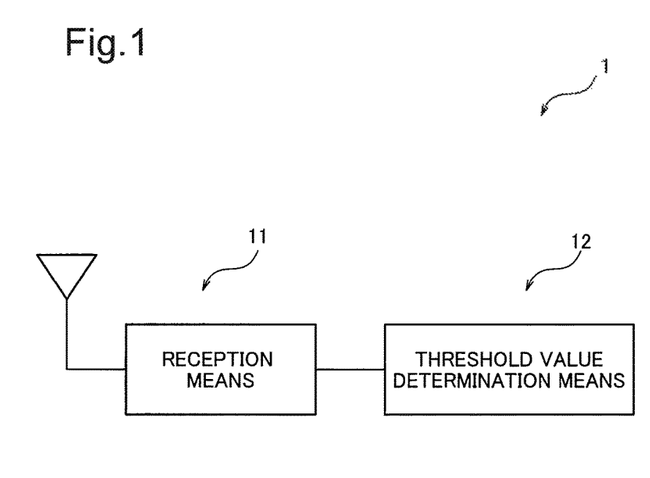
FIG. 1 is a diagram showing a wireless communication apparatus according to the present invention.

FIG. 1 is a diagram showing a wireless communication apparatus 1 according to the present invention. As shown in FIG. 1, the wireless communication apparatus 1 includes a reception means 11 and a threshold value determination means 12.

The reception means 11 receives radio waves. According to the number of intersections between a variation curve of radio wave intensity relative to frequencies of radio waves received by the reception means 11 and a first line indicating a given radio wave intensity, the threshold value determination means 12 determines a threshold value of radio wave intensity for distinguishing whether the received radio waves are noise or not.

According to the wireless communication apparatus 1 according to the present invention, a threshold value for distinguishing whether received radio waves are noise or not can be determined without depending on the capability of an operator.

Meanwhile, even an analysis apparatus which does not have the reception means 11 and has only the threshold value determination means 12 can determine a threshold value for distinguishing whether received radio waves are noise or not without depending on the capability of an operator.

Exemplary Embodiment 1

Hereinafter, an exemplary embodiment will be described with reference to a drawing. Meanwhile, although processing using an input port voltage as radio wave intensity is described as an example hereinafter, radio wave intensity may be electric field strength, magnetic field strength or power density, for example.

Figure 2:
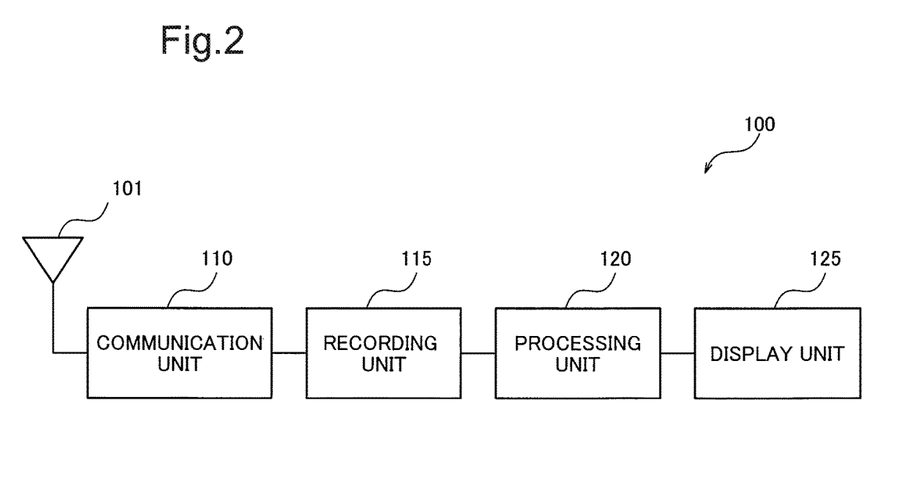
FIG. 2 is a diagram showing a wireless communication apparatus according to exemplary embodiment 1.

FIG. 2 is a diagram showing a wireless communication apparatus 100 according to exemplary embodiment 1. As shown in FIG. 2, the wireless communication apparatus 100 includes a sensor device 101, a communication unit 110, a recording unit 115, a processing unit 120 and a display unit 125.

The sensor device 101 and the communication unit 110 correspond to the reception means 11 shown in FIG. 1. The sensor device 101 includes an antenna and a receiver. The sensor device 101 receives a radio wave and outputs a radio signal to the communication unit 110. The communication unit 110 performs necessary processing to the outputted radio signal and obtains radio wave information which is information about the radio wave. Radio wave information includes each frequency included in a radio wave, an input port voltage of each frequency and a clock time, for example. The communication unit 110 outputs the radio wave information to the recording unit 115. The recording unit 115 records the radio wave information.

The processing unit 120 corresponds to the threshold value determination means 12 shown in FIG. 1. The processing unit 120 possesses each component shown in FIG. 3, performs processing which will be mentioned later using radio wave information recorded in the recording unit 115 and determines a threshold value. The processing unit 120 outputs the determined threshold value to the display unit 125. The display unit 125 is a CRT (Cathode Ray Tube), a liquid crystal display, a printer or the like, for example, and indicates a threshold value determined by the processing unit 120 visually.

Figure 3:
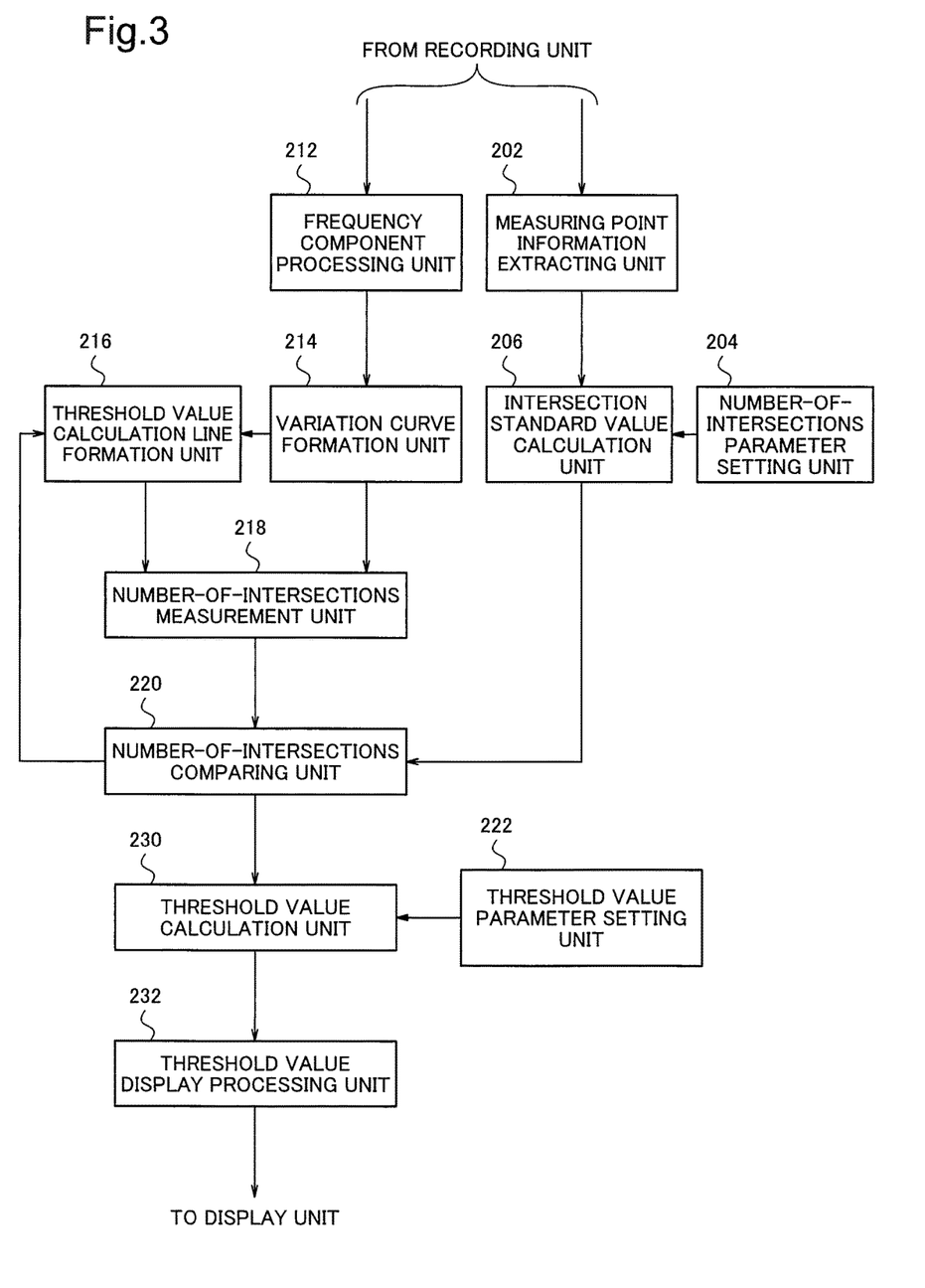
FIG. 3 is a diagram showing each component which is realized by a processing unit according to the exemplary embodiment 1.
Figure 4:
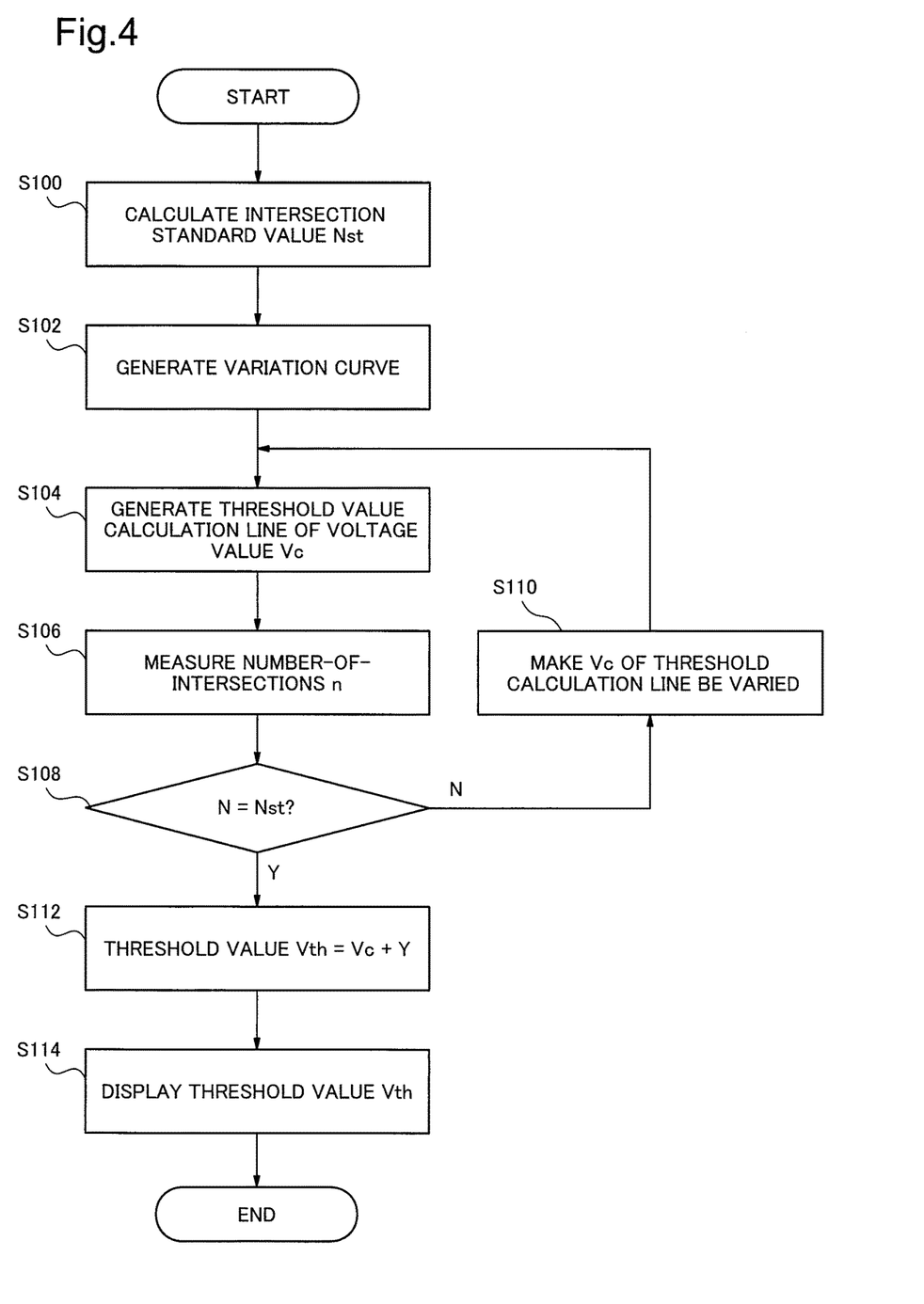
FIG. 4 is a flow chart showing processing to be made by a processing unit according to the exemplary embodiment 1.
Figure 5:
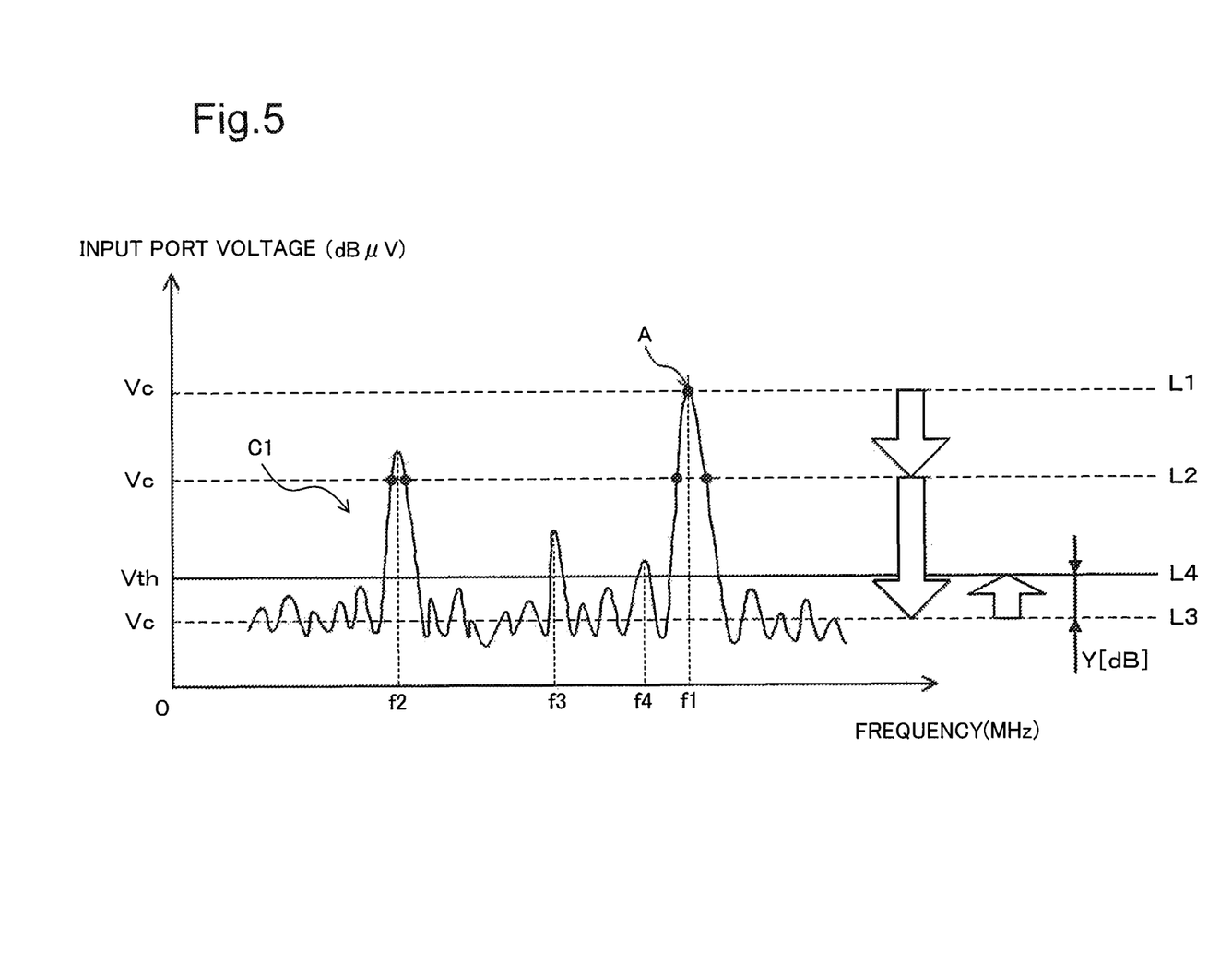
FIG. 5 is a diagram for explaining processing to be made by a processing unit according to the exemplary embodiment 1.

FIG. 3 is a diagram showing each component which is realized by the processing unit 120 shown in FIG. 2. FIG. 4 is a flow chart showing processing to be made by the processing unit 120. FIG. 5 is a diagram to explain processing to be made by the processing unit 120.

As shown in FIG. 3, the processing unit 120 includes a measuring point information extracting unit 202, a number-of-intersections parameter setting unit 204, an intersection standard value calculation unit 206, a frequency component processing unit 212, a variation curve formation unit 214, a threshold value calculation line formation unit 216, a number-of-intersections measurement unit 218, a number-of-intersections comparing unit 220, a threshold value parameter setting unit 222, a threshold value calculation unit 230 and a threshold value display processing unit 232.

Meanwhile, each component which the processing unit 120 realizes can be realized by executing a program by control of an arithmetic unit (not shown) provided in the processing unit 120, for example. More specifically, it is realized such that a program which has been stored in a recording medium (not shown) included in the processing unit 120 is loaded into a memory (not shown), and, then, the program is executed by control of the arithmetic unit. Each component may be realized by any combination among hardware, firmware and software without limiting to realizing it by software by a program.

The intersection standard value calculation unit 206 calculates intersection standard value Nst based on measuring point information extracted by the measuring point information extracting unit 202 (S100), and outputs the calculated intersection standard value Nst to the number-of-intersections comparing unit 220. Specifically, the measuring point information extracting unit 202 extracts the number of measurement points N of received radio waves from radio wave information recorded in the recording unit 115 as measuring point information, and outputs it to the intersection standard value calculation unit 206. Meanwhile, the number of measurement points N is defined by N=(bandwidth)/(resolution), for example. Intersection standard value Nst (a first numerical value) is used by processing in the number-of-intersections comparing unit 220 mentioned later.

The intersection standard value calculation unit 206 calculates intersection standard value Nst using a formula defined by Nst=Round (N*X/100, 0). Specifically, the intersection standard value calculation unit 206 obtains intersection standard value Nst of an integer by multiplying number-of-intersections parameter X [%] by the number of measurement points N, and, then, dividing it by 100, and, when N*X/100 is not an integer, further rounding off the first decimal place. Meanwhile, although it has been supposed that the first decimal place of (N*X/100) is rounded off in order to make intersection standard value Nst be an integer, the first decimal place may be rounded up or it may be rounded down.

The number-of-intersections parameter X (a second parameter) is a numerical value which indicates a proportion of the number of measurement points N, and it is 0<X<100, for example, and is preferably X=50 [%]. The number-of-intersections parameter X may be a fixed value, or may be set such that it can be changed to an optional numerical value according to processing of the number of intersections parameter setting unit 204. According to an operator operating an input device such as a keyboard or a touch panel, for example, the number of intersections parameter setting unit 204 sets number-of-intersections parameter X and outputs the number-of-intersections parameter X having been set to the intersection standard value calculation unit 206. Thus, by the number of intersections parameter setting unit 204 setting number-of-intersections parameter X, the number-of-intersections parameter X can be changed to an optional numerical value through accumulation and an analysis of operational data.

The frequency component processing unit 212 accepts radio wave information recorded in the recording unit 115 and performs predetermined processing about frequency components, and the variation curve formation unit 214 generates a variation curve of radio wave intensity relative to frequencies of radio waves (S102). Specifically, the frequency component processing unit 212 accepts radio wave information recorded in the recording unit 115 and associates the frequency of a frequency component included in the received radio waves with an input port voltage corresponding to the frequency. The frequency component processing unit 212 outputs information in which a frequency and an input port voltage are made to be associated to the variation curve formation unit 214. The variation curve formation unit 214 generates a variation curve of input port voltages relative to frequencies of the radio waves from the information from the frequency component processing unit 212.

In FIG. 5, there is illustrated input port voltage-frequency curve C1 which is an example of a variation curve. As illustrated in FIG. 5, the variation curve formation unit 214 generates input port voltage-frequency curve C1 by plotting input port voltages relative to the frequency of each frequency component and linking them in a manner making a frequency [MHz] be a horizontal axis and an input port voltage [dBμV] be a vertical axis.

The threshold value calculation line formation unit 216 generates a threshold value calculation line for calculating a threshold value of an input port voltage (radio wave intensity) for distinguishing whether received radio waves are noise or not on the input port voltage-frequency curve C1 (S104). Specifically, the threshold value calculation line formation unit 216 generates a threshold value calculation line which indicates fixed voltage value Vc as shown in L1 of FIG. 5. An initial value of voltage value Vc may be an input port voltage value at the peak point where an input port voltage is the largest (point A of FIG. 5), for example.

The number-of-intersections measurement unit 218 measures the number of intersections (number-of-intersections) n between input port voltage-frequency curve C1 generated by the variation curve formation unit 214 (S106), and outputs it to the number-of-intersections comparing unit 220.

The number-of-intersections comparing unit 220 compares number-of-intersections n measured by the number-of-intersections measurement unit 218 and intersection standard value Nst, and determines whether number-of-intersections n is equal to intersection standard value Nst or not (S108).

When being determined by the number-of-intersections comparing unit 220 that number-of-intersections n is not equal to intersection standard value Nst (N in S108), the threshold value calculation line formation unit 216 makes a numerical value of voltage value Vc be varied (S110), and generates a threshold value calculation line which indicates voltage value Vc which has been varied (S104). Specifically, when determining that number-of-intersections n is not equal to intersection standard value Nst, the number-of-intersections comparing unit 220 outputs a signal which indicates to that effect to the threshold value calculation line formation unit 216. When the signal from the number-of-intersections comparing unit 220 is accepted, the threshold value calculation line formation unit 216 subtracts a predetermined value from voltage value Vc, and generates a threshold value calculation line (first line) which indicates voltage value Vc after subtraction on the input port voltage-frequency curve C1.

In this case, again, the number-of-intersections measurement unit 218 measures number-of-intersections n (S106), and the number-of-intersections comparing unit 220 determines whether number-of-intersections n has become equal to intersection standard value Nst or not (S108). In this way, by the number-of-intersections comparing unit 220, the processing of S104-S110 is repeated until it is determined that number-of-intersections n has become equal to intersection standard value Nst.

At that time, in FIG. 5, a threshold value calculation line varies toward the direction where an input port voltage decreases from L1 to L3 via L2 on the input port voltage-frequency curve C1. For example, in a case where a threshold value calculation line is at the position of L1, the number-of-intersections measurement unit 218 measures as number-of-intersections n=1, and in a case where a threshold value calculation line is at the position of L2, the number-of-intersections measurement unit 218 measures as number-of-intersections n=4. Thus, when the processing of S104-S110 is repeated, number-of-intersections n which is measured by the number-of-intersections measurement unit 218 is increased.

When being determined by the number-of-intersections comparing unit 220 that number-of-intersections n has become equal to intersection standard value Nst (Y in S108), the threshold value calculation unit 230 calculates threshold value Vth of an input port voltage (radio wave intensity) by adding a threshold parameter Y to voltage value Vc corresponding to the threshold value calculation line at that time (S112), and outputs it to the threshold value display processing unit 232. For example, in FIG. 5, when supposing that number-of-intersections n has become equal to intersection standard value Nst when a threshold value calculation line reaches the position of L3, the threshold value calculation unit 230 adds threshold parameter Y to voltage value Vc of the threshold value calculation line at the position of L3 and calculates threshold value Vth. Accordingly, in the example of FIG. 5, the frequencies f1, f2, f3 and f4 are made to be effective frequencies, and the other frequencies are made to be noise.

Threshold parameter Y (a first parameter) is preferably Y=6.0 [dB]. Threshold parameter Y may be a fixed value, or may be set such that it can be changed to an optional numerical value according to processing of the threshold value parameter setting unit 222. According to an operator operating an input unit such as a keyboard or a touch panel, the threshold value parameter setting unit 222 sets threshold parameter Y and outputs the threshold parameter Y having been set to the threshold value calculation unit 230. Thus, by the threshold value parameter setting unit 222 setting threshold parameter Y, threshold parameter Y can be changed to an optional numerical value through accumulation and an analysis of operational data.

The threshold value display processing unit 232 performs processing for displaying threshold value Vth on the display unit 125 (S114).

Specifically, the threshold value display processing unit 232 performs processing for displaying input port voltage-frequency curve C1 shown in FIG. 5, a threshold value calculation line which indicates threshold value Vth (position of L4) and a numerical value of threshold value Vth on the display unit 125. By indicating a threshold value to the display unit 125, an operator can check the threshold value visually.

As above, by the threshold value calculation line formation unit 216 being constituted so as to make a numerical value of voltage value Vc vary, a threshold value calculation line passes the peak points of effective frequencies (frequencies f1, f2, f3 and f4 in FIG. 5, for example) in the course of the processing, and a threshold value which classifies a frequency that is originally effective as being effective, not as noise, can be determined certainly.

By composing the threshold value calculation unit 230 as mentioned above, a threshold value which can classify effective frequencies and noise certainly can be determined. In other words, if the position of a threshold value calculation line at the time when number-of-intersections n and an intersection standard value Nst are equal is made to be a threshold value, there is a possibility that not only an effective frequency, but also frequencies which should be classified as noise naturally (the frequencies besides the frequencies f1, f2, f3 and f4) are made to be effective. Accordingly, by adding threshold parameter Y, a threshold value by which frequencies which are not effective are excluded can be determined more certainly.

Furthermore, by the intersection standard value calculation unit 206 being constituted as mentioned above, a threshold value can be determined according to the number of measuring points of a frequency. In other words, when the number of measurement points N is large, number-of-intersections n when a threshold value calculation line is at the position for calculating a threshold value (position of L3 of FIG. 5) is large, however, in this case, intersection standard value Nst is also large. Accordingly, a threshold value which distinguishes whether it is an effective frequency or noise can be determined without depending on a bandwidth and resolution.

Meanwhile, the present invention is not limited to the above-mentioned exemplary embodiment, and it can be modified appropriately within a range that does not deviate from the gist as follows.

For example, the processing unit 120 does not need to be installed in the wireless communication apparatus 100. The processing unit 120 may be provided independently with a wireless communication apparatus as an analysis apparatus which analyzes a radio wave received by the wireless communication apparatus equipped with a receiver, for example.

Further, in the exemplary embodiment mentioned above, although it is supposed that the variation curve formation unit 214 generates a variation curve, and the threshold value calculation line formation unit 216 generates a threshold value calculation line, a variation curve and a threshold value calculation line do not need to be generated actually, respectively. For example, it may be calculated from information in which a frequency of a frequency component and an input port voltage corresponding to the frequency are associated with each other, as follows.

For example, in FIG. 5, it is supposed that the input port voltage of frequency f1 is V1, the input port voltage of frequency f2 is V2, the input port voltage of frequency f3 is V3, and the input port voltage of frequency f4 is V4. At that time, when Vc=V1, it is measured as number-of-intersections n=1, when V2<Vc<V1, it is measured as number-of-intersections n=2, and when Vc=V2, it is measured as number-of-intersections n=3. When V3<Vc<V2, it is measured as number-of-intersections n=4, and when Vc=V3, it is measured as number-of-intersections n=5, and when V4<Vc<V3, it is measured as number-of-intersections n=6, and when Vc=V4, it is measured as number-of-intersections n=7.

The display unit 125 may indicate processing in the course of calculating a threshold value (S100-S108 of FIG. 4) accordingly. Specifically, for example, the display unit 125 may indicate a variation curve when the variation curve is generated in the processing of S102, and may indicate a threshold value calculation line when the threshold value calculation line is generated in the processing of S104. In addition, when voltage value Vc of a threshold value calculation line varies in the processing of S110, display of a threshold value calculation line may be indicated in a varied manner.

Meanwhile, in the flow chart shown in FIG. 4, the order of pieces of processing (steps) can be changed appropriately. For example, in the example of FIG. 4, although it is supposed that the processing S104 and S102 are performed after the processing of S100, the processing of S100 may be carried out after the processing of S102 or the processing of S104, or S100 may be performed simultaneously with the processing of S102 or the processing of S104. No smaller than one piece of processing among a plurality of pieces of processing (steps) may be omitted. For example, the processing of S114 can be omitted.

In the above-mentioned exemplary embodiment, although the present invention has been described as a configuration of hardware, the present invention is not limited to this. The present invention can realize optional piece of processing by making CPU (Central Processing Unit) execute a computer program.

A program is stored using various types of non-transitory computer readable media (non-transitory computer readable medium), and can be supplied to a computer. A non-transitory computer readable medium includes various types of substantial recording media (tangible storage medium). An example of a non-transitory computer readable medium includes a magnetic recording medium (a flexible disc, magnetic tape and hard disk drive, for example), a magneto-optic recording medium (magneto-laser disk, for example), a CD-ROM (Read Only Memory), a CD-R, a CD-R/W and a semiconductor memory (a mask ROM, PROM (Programmable ROM), EPROM (Erasable PROM), flash ROM and RAM (random access memory), for example). A program may be supplied by various types of transitory computer readable media (transitory computer readable medium) to a computer. An example of a transitory computer readable medium includes an electric signal, a light signal and a radio wave. A transitory computer readable medium can supply a program to a computer via a wired communication path such as an electric wire, an optic fiber or a radio channel.

Although the present invention has been described with reference to the exemplary embodiment above, the present invention is not limited by the above. Various changes which a person skilled in the art can understand in the scope of invention can be performed in the composition and details of the present invention.

This application claims priority based on Japanese application Japanese Patent Application No. 2013-008657 filed on Jan. 21, 2013, the disclosure of which is incorporated herein in its entirety.

REFERENCE SIGNS LIST

1 Wireless communication apparatus
11 Reception means
12 Threshold value determination means
100 Wireless communication apparatus
101 Sensor equipment
110 Communication unit
115 Recording unit
120 Processing unit
125 Display unit
202 Measuring point information extracting unit
204 Number of intersections parameter setting unit
206 Intersection standard value calculation unit
212 Frequency component processing unit
214 Variation curve formation unit
216 Threshold value calculation line formation unit
218 Number-of-intersections measurement unit
220 Number-of-intersections comparing unit
222 Threshold value parameter setting unit
230 Threshold value calculation unit
232 Threshold value display processing unit

What is claimed is:

1. A wireless communication apparatus, comprising:
a receiver for receiving radio waves; and
a processor for determining, on a basis of a number of intersections between a variation curve of radio wave intensity relative to frequencies of radio waves received by said receiver and a first line indicating a given radio wave intensity, a threshold value of radio wave intensity for distinguishing whether received radio waves are noise,
wherein said processor, based on a numerical value of radio wave intensity corresponding to said first line at a time when said number of intersections is equal to a first numerical value set in advance when a numerical value of radio wave intensity corresponding to said first line is made to be varied, determines said threshold value.

2. The wireless communication apparatus according to claim 1, wherein said processor determines said threshold value by adding a first parameter to a numerical value of radio wave intensity corresponding to said first line at a time when said number of intersections is equal to said first numerical value when a numerical value of radio wave intensity corresponding to said first line is made to be varied.

3. The wireless communication apparatus according to claim 1, further comprising a calculator for calculating said first numerical value based on a number of measuring points of frequencies of received radio waves and a first parameter, wherein said processor determines said threshold value based on a numerical value of radio wave intensity corresponding to said first line when said number of intersections is equal to said first numerical value calculated by said calculator when a numerical value of radio wave intensity corresponding to said first line is made to be varied.

4. The wireless communication apparatus according to claim 2, wherein the processor sets said first parameter.

5. The wireless communication apparatus according to claim 3, wherein the processor sets said first parameter.

6. The wireless communication apparatus according to claim 1, wherein said radio wave intensity is an input port voltage corresponding to a frequency.

7. An analysis apparatus, comprising:
a receiver for receiving radio waves; and
a processor for determining, on a basis of a number of intersections between a variation curve of radio wave intensity relative to frequencies of radio waves received by said receiver and a first line indicating a given radio wave intensity, a threshold value of radio wave intensity for distinguishing whether received radio waves are noise,
wherein said processor, based on a numerical value of radio wave intensity corresponding to said first line at a time when said number of intersections is equal to a first numerical value set in advance when a numerical value of radio wave intensity corresponding to said first line is made to be varied, determines said threshold value.

8. An analysis method for determining a threshold value with a wireless communication apparatus, the method comprising: detecting a number of intersections between a variation curve of radio wave intensity relative to frequencies of received radio waves and a first line indicating a given radio wave intensity; and determining, on a basis of said detected number of intersections, a threshold value of radio wave intensity for distinguishing whether received radio waves are noise,
and, based on a numerical value of radio wave intensity corresponding to said first line at a time when said number of intersections is equal to a first numerical value set in advance when a numerical value of radio wave intensity corresponding to said first line is made to be varied, determining said threshold value.

9. A non-transitory computer readable medium storing a program making a computer execute:
detecting a number of intersections between a variation curve of radio wave intensity relative to frequencies of received radio waves and a first line indicating a given radio wave intensity; and
determining a threshold value of radio wave intensity for distinguishing whether received radio waves are noise according to said number of intersections having been detected,
and, based on a numerical value of radio wave intensity corresponding to said first line at a time when said number of intersections is equal to a first numerical value set in advance when a numerical value of radio wave intensity corresponding to said first line is made to be varied, determining said threshold value.

* * * * *